United States Patent [19]

Muramatsu

[11] Patent Number: 5,585,885
[45] Date of Patent: Dec. 17, 1996

[54] CAMERA PHOTOMETER

[75] Inventor: Masaru Muramatsu, Kawasaki, Japan

[73] Assignee: Nikon Corporation, Tokyo, Japan

[21] Appl. No.: 190,843

[22] Filed: Feb. 3, 1994

[30] Foreign Application Priority Data

Mar. 9, 1993 [JP] Japan .................. 5-075281

[51] Int. Cl.$^6$ ................................ G03B 7/099
[52] U.S. Cl. ................ 396/111; 396/271; 396/233
[58] Field of Search ................... 354/432, 482,
354/200, 201, 100, 101, 102, 478, 406,
407, 408; 359/568, 570, 753, 574, 575,
565, 885; 356/222, 225; 348/342

[56] References Cited

U.S. PATENT DOCUMENTS

| | | | |
|---|---|---|---|
| 3,756,695 | 9/1973 | Mino et al. | 359/885 X |
| 3,903,413 | 9/1975 | Manning | 354/482 X |
| 4,357,086 | 11/1982 | Shimomura et al. | 354/407 |
| 4,358,186 | 11/1982 | Johnson et al. | 354/482 |
| 4,412,730 | 11/1983 | Saegusa et al. | 354/432 |
| 4,428,654 | 1/1984 | Dietz | 354/482 X |
| 4,474,446 | 10/1984 | Reynolds et al. | 354/402 |
| 4,477,172 | 10/1984 | Yokota | 354/482 X |
| 4,482,230 | 11/1984 | Magariyama et al. | 354/407 X |
| 4,641,022 | 2/1987 | Suzuki | 354/408 X |
| 4,774,539 | 9/1988 | Suda et al. | 354/432 X |
| 5,161,058 | 11/1992 | Matsui | 354/200 X |
| 5,189,454 | 2/1993 | Yamazaki et al. | 354/200 |
| 5,414,487 | 5/1995 | Iwasaki | 354/432 |

OTHER PUBLICATIONS

Journal of Applied Physics, Japan; "Optical Noise Filter"; Kazuo Sayanagi; vol. 27, No. 10; pp. 623–632; Oct. 10 1958.

"Optical Noise Filter", Kazuo Sayanagi; Canon Camera Co., Ohta-ku, Tokyo; pp. 623–632; Oct. 27, 1958.

*Primary Examiner*—W. B. Perkey
*Attorney, Agent, or Firm*—Oliff & Berridge

[57] ABSTRACT

An optical low-pass filter is built with circular phase components consisting of randomly distributed convex and concave surfaces. The area of the phase components is structured to cover ½ the entire surface area of the low-pass filter. Moreover, the phase components are set to a height such that the phase difference between the light passing through the phase components and the other areas of the filter is ½ its wavelength. The optical low-pass filter is installed in front of the photometric optical system. It is therefore possible to precisely measure light regardless of incidence of light from the photographic subject even when using photometric sensors that have been divided into multiple units.

15 Claims, 3 Drawing Sheets

CAMERA PHOTOMETER

BACKGROUND OF THE INVENTION

1. Field of the Invention

This invention relates to a camera photometer that uses divided photometry.

2. Description of Related Art

The prior art includes a type of photometer within a single-lens reflex camera wherein an image of the photographic subject is formed on the finder screen and is again formed on multiple photometric sensors through the action of image forming optics. The photometer measures light in a scattered manner with the photo image being divided into multiple segments.

However, in photometers that use the conventional divided photometry technology described above, it has not been possible to obtain correct photometric values relative to incidental light falling between the photometric sensors. This occurs because a non-sensing area exists between each photometric sensor.

The above problem worsens when the size of each photometric sensor decreases in conjunction with an increase in the number of image divisions. This is because the width of the non-sensing area cannot be reduced substantially while ensuring output separation characteristics.

SUMMARY OF THE INVENTION

A primary object of the present invention is to provide a camera photometer that can precisely measure light regardless of the incidence of the light from the photographic subject, even when using photometric sensors that have been divided into multiple units.

The present invention solves the aforementioned problems in the prior art as described hereafter. Although the invention uses labels relating to the preferred embodiment in order to facilitate understanding, the invention is not restricted to this embodiment as will be understood by those of ordinary skill in the art.

The preferred embodiment of a camera photometer according to this invention is characterized by an optical low-pass filter that eliminates the high frequency component of spacial frequencies from the photographic subject. This filter is used in a photometric optical system within a camera photometer having a photometric optical system for forming the image of a photographic subject through multiple photometric sensors that measure the light from the photographic subject within a photographic image.

With this invention, the high frequency component of light from the photographic subject is eliminated by the optical low-pass filter. Light entering the non-sensing area between each photometric sensor can then be appropriately diffused.

According to this invention, an optical low-pass filter is built with phase components consisting of randomly distributed convex and concave surfaces. It is easy to control the diffusion characteristics created by the convex and concave surfaces of the phase components. Furthermore, there is no generation of interference patterns because the phase components are distributed randomly.

The invention is also characterized by an optical low-pass filter with the aforementioned phase components covering nearly ½ the entire surface area of the filter. The phase components are set to a height so that the phase difference between the light passing through the phase components and other areas of the filter is ½ the wavelength of the light passing through the filter. As a result, the portion of light travelling in straight lines that passes through the optical low-pass filter is canceled out, providing a strength nearly equal to zero because the phase of the light passing through the phase components is shifted exactly ½ the wavelength of the light passing through the remainder of the filter. Thus, only the dispersed portion of the light due to the action of diffraction is left.

The optical low-pass filter is characterized by its phase components being circular in shape and having a diameter D defined by the following relationship:

$$D \leq \lambda \ast f/p$$

where:

λ=the wavelength of the measured light;

f=the focal distance of the photometric optical system; and p=the space between the photometric sensors.

Also in this invention, the optical low-pass filter is installed in front of the photometric optical system. Thus, the space between the optical low-pass filter and the photometric optical system has no influence on the low-pass effect because the low-pass filter is installed in front of the photometric optical system.

DETAILED DESCRIPTION OF PREFERRED EMBODIMENTS

A description of an actual embodiment of this invention is provided hereafter, with reference to the drawings.

Figure 1:
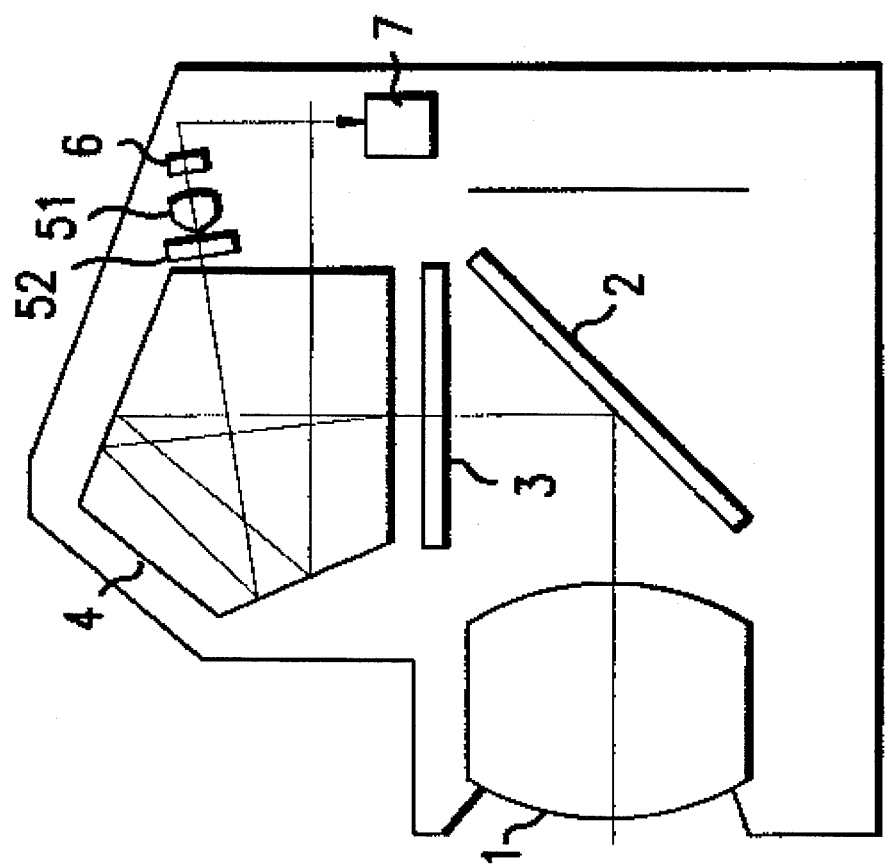
FIG. 1 is a schematic diagram showing the preferred embodiment of a camera photometer built according to this invention.

FIG. 1 is a schematic drawing showing the preferred embodiment of an actual operation of a camera photometer built with this invention. In operation, the light from the photographic subject (not shown) passes through a photographic lens 1 and is reflected by a quick return mirror 2, and an image is formed on a finder screen 3. The image of the photographic subject on finder screen 3, after passing through a pentaprism 4, passes through a low-pass filter 52. The image of the photographic subject is again formed on multiple divided photometric sensors 6 by the action of a photometric image forming lens 51. Multiple divided photometric sensors 6 detect the brightness distribution of the photographic subject, and after the light is converted into electric signals, the signals are sent to a photometric calculating device 7 to determine the camera light exposure.

Figure 2:
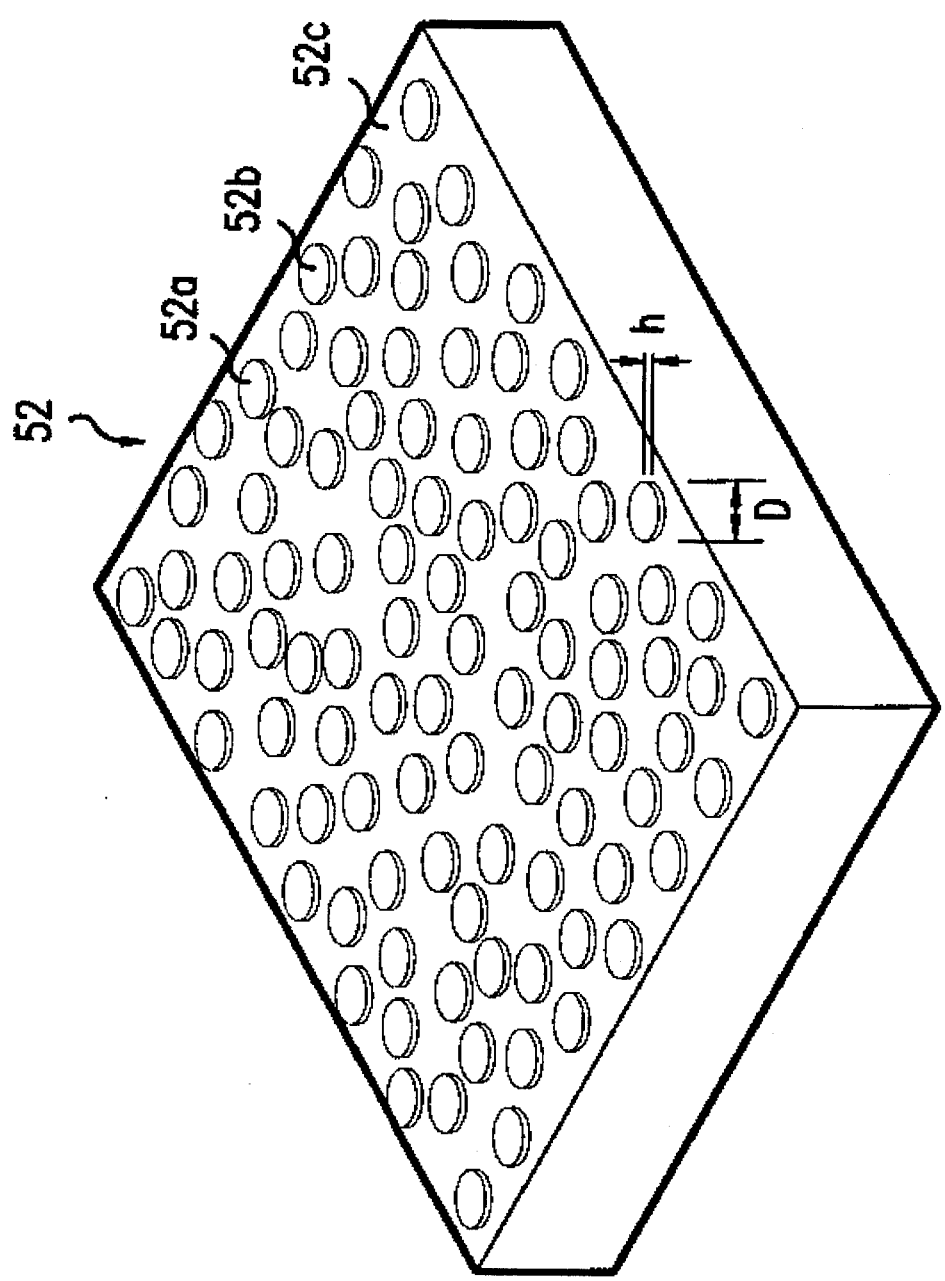
FIG. 2 is a perspective view showing an optical low-pass filter in the preferred embodiment of this invention.

FIG. 2 shows the configuration of the optical low-pass filter in the preferred embodiment. As seen in FIG. 2, optical low-pass filter 52 has multiple circular phase components 52a and 52b, which are minuscule convex and concave surfaces, respectively, randomly placed on a flat, transparent surface 52c. The surface is constructed so that the area of circular phase components 52a and 52b and the area of the flat surface 52c are nearly balanced. Furthermore, circular phase components 52a and 52b are set to a height h so that the phase difference between the light that passes through the phase components 52a and 52b and the flat surface 52c is ½ the wavelength of the measured light.

In this instance, with the optical low-pass filter 52 of this embodiment, because the filter is built of material with a refractive index of n and has an effect on light near the wavelength λ, the height h of the surfaces of the phase components 52a and 52b can be found by the following relationship:

$$h=\lambda*0.5/(n-1)$$

When the height h of the surfaces of the phase components 52a and 52b is determined in this way, the light travelling in straight lines passing through the optical low-pass filter 52 is canceled out. This light has a strength nearly equal to zero because the phase of the light passing through the phase components 52a and 52b is shifted exactly ½ the wavelength of the light passing through the flat surface 52c. This leaves only the dispersed portion of the light due to the action of diffraction.

Furthermore, the phase components 52a and 52b are distributed randomly to generally prevent the generation of interference patterns. Through this random distribution, the high frequency component of spacial frequencies of the image that is formed by the photometric optical system 51 is eliminated. In other words, the camera possesses a so-called optical low-pass effect.

Figure 3:
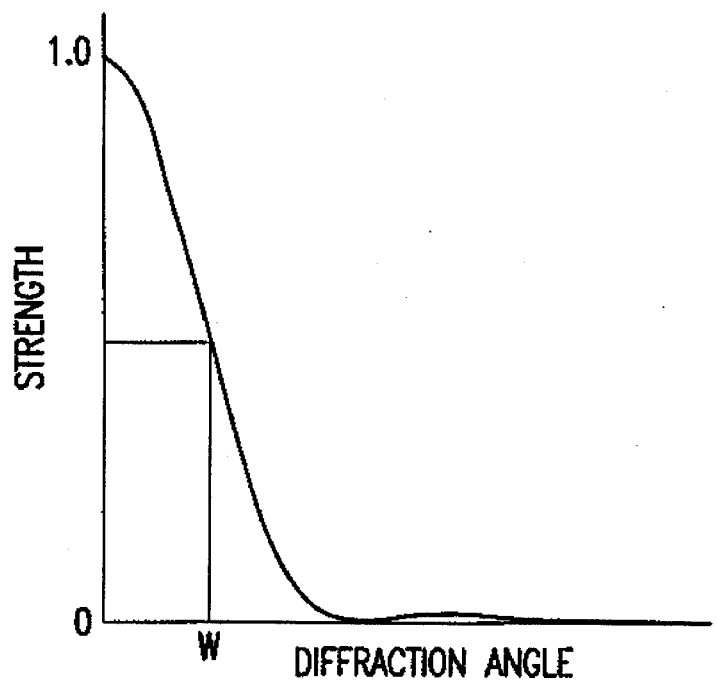
FIG. 3 is a graph showing the diffusion characteristics of the optical low-pass filter shown in FIG. 2.

FIG. 3 is a graph of the dispersion characteristics created by the diffraction of the optical low-pass filter 52 in this embodiment.

The diameter of the circular phase components 52a and 52b is determined so that the diffraction angle value W on the diffraction angle axis is more than the photometric sensor spacing. The diffraction component W is in inverse proportion to diameter D of the circular phase components as shown in FIG. 3. In this instance, W signifies the value at which the angle of diffraction is ½ the peak intensity.

The diameter D of the circular phase components 52a and 52b suitable for light with a wavelength near to λ is determined by the following relationship:

$$D \leq \lambda*f/p$$

where p is the photometric sensor spacing and f is the focal distance of the image forming lens 51.

The desired low-pass effect can be obtained by selecting the diameter D of the circular phase components 52a and 52b as seen above. Moreover, precisely controlling the low-pass effect becomes possible because the diameter of these phase components can be precisely set. Furthermore, if the low-pass filter 52 is placed in front of the image forming lens 51, there is a comparatively low degree of precision in setting the lens, because the space between the image forming lens 51 and the low pass filter 52 has almost no influence on the low-pass effect.

Figure 4:
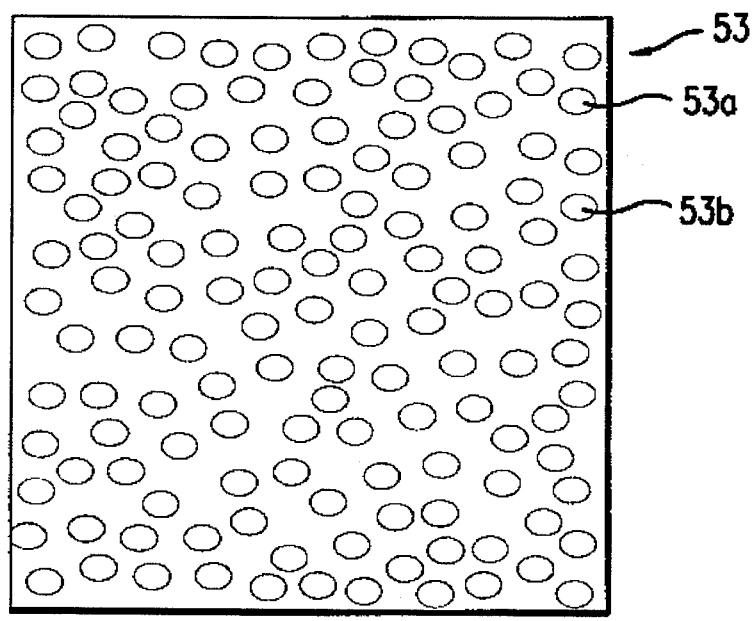
FIG. 4 is a surface diagram showing the optical low-pass filter in the second embodiment of this invention.

FIG. 4 is an illustration showing the optical low-pass filter used in a second embodiment of a camera photometer according to this invention.

The optical low-pass filter 53 in this embodiment has elliptically shaped convex and concave phase components 53a and 53b, respectively. These phase components 53a provide different low-pass effects with the major axis and the minor axis. This type of optical low-pass filter 53 can be used when the desired low-pass effect differs horizontally and vertically, such as with photometric sensors with different spacing in the horizontal or vertical direction. One can determine the size of the major axis and the minor axis for the phase components 53a and 53b on this low-pass filter 53 by the horizontal and vertical spacing of the photometric sensors and by applying the previously described relationship $$D \leq \lambda*f/p$$

This invention is not limited to the embodiments explained above, and various changes in shape and various alterations are possible and included in this invention. For example, the circular phase components 52a, 52b and 53a, 53b could be designed as pits having convex and concave contours as well.

Also, although a single-lens reflex camera has been described herein, one could apply this invention to divided light photometers in lens shutter cameras also.

Moreover, the optical low-pass filter 52, 53 could be easily manufactured by using manufacturing technologies such as lithography, which is utilized in manufacturing semiconductors. Also, large volume, inexpensive manufacturing becomes possible by using plastic molding techniques.

As explained above in detail this invention allows light to be precisely measured without regard to the position of incidental light from the photographic subject, even if one uses multiply divided photometric sensors, through the action of an optical low-pass filter.

Control of the light diffusion characteristics is made easy through the use of an optical low-pass filter built with phase components consisting of convex and concave surfaces. Moreover, because the phase components are randomly distributed, the invention prevents the generation of interference patterns.

The invention can diffuse light to an appropriate degree, because the optical low-pass filter is built with phase components covering nearly ½ the entire surface area. The phase components are set to a height such that the phase difference between the light passing through the phase components and other portions of the filter is ½ its wavelength, and the light travelling in straight lines passing through the optical low-pass filter is canceled out. This light has a strength nearly equal to zero because the phase of the light passing through the phase components is shifted exactly ½ the wavelength of the light passing through the other portions of the filter. This leaves only the dispersed portion of the light due to the action of diffraction.

One can obtain the desired low-pass effect by setting the diameter of the circular phase components as desired. It also becomes possible to precisely set the most appropriate low-pass effect with the structure of the photometric sensors used.

Further, one can install an optical low-pass filter with a low degree of precision because the optical low-pass filter is built in front of the photometric optical system. Hence, the space between the low pass filter and the photometric optical system has no influence on the low-pass effect.

What is claimed is:

1. A camera comprising:

a photographic image forming lens that forms a first composed image from light rays passing therethrough from a photographic subject;

a finder screen disposed adjacent the photographic image forming lens on which the first composed image of the photographic subject is formed;

an optical low-pass filter that filters a high frequency component of light from the first composed image for accurate measurement of light, said optical low-pass filter being disposed adjacent to and downstream from the finder screen, said optical low-pass filter comprising a plurality of phase components randomly arranged on a flat surface to prevent generation of interference patterns of light;

a photometric image forming lens that forms a photometric image of the photographic subject from the filtered light from the optical low-pass filter, said photometric image forming lens being disposed downstream from said optical low-pass filter such that light passes through said photometric image forming lens to form a second composed image; and a photometric sensor disposed substantially at a point where the second composed image is formed that measures light from the second composed image in order to determine light exposure for the photographic subject, wherein the phase components have a diameter D defined by $D \leq \lambda * f/p$, wherein $\lambda$ is a wavelength of measured light passing through the optical low-pass filter, f is the focal distance of the photometric image forming lens, and p is a spacing relationship of individual sensors in the photometric sensor.

2. The camera of claim 1 wherein the phase components include convex and concave elements.

3. The camera of claim 1 wherein the phase components have a circular shape.

4. The camera of claim 1 wherein the phase components have an elliptical shape.

5. The camera of claim 1 wherein the phase components cover approximately one-half of the flat surface.

6. The camera of claim 1 wherein the phase components cover approximately one-half of the flat surface.

7. A camera comprising:

a photographic image forming lens that forms a first composed image from light rays passing therethrough from a photographic subject;

a finder screen disposed adjacent the photographic image forming lens on which the first composed image of the photographic subject is formed;

an optical low-pass filter that filters a high frequency component of light from the first composed image for accurate measurement of light, the optical low-pass filter being disposed adjacent to and downstream from the finder screen, the optical low-pass filter comprising a plurality of phase components randomly arranged on a flat surface to prevent generation of interference patterns of light, wherein the phase components have a height h defined by $h = \lambda * 0.5/(n-1)$, wherein $\lambda$ is a wavelength of measured light passing through the optical low-pass filter and n is a refractive index of material forming the optical low-pass filter;

a photometric image forming lens that forms a photometric image of the photographic subject from the filtered light from the optical low-pass filter, the photometric image forming lens being disposed downstream from the optical low-pass filter such that light passes through the photometric image forming lens to form a second composed image; and a photometric sensor disposed substantially at a point where the second composed image is formed that measures light from the second composed image in order to determine light exposure for the photographic subject.

8. A camera comprising:

a photometric image forming lens that forms a photometric image of a photographic subject;

a photometric sensor that measures light from the photographic subject in the photometric image; and an optical low-pass filter that filters a high frequency component of light from the photographic subject to allow accurate measurement of light by the photometric sensor means, wherein said optical low-pass filter includes a plurality of phase components randomly arranged on a flat surface to prevent generation of interference patterns of light and wherein said phase components have a height h defined by $h = \lambda * 0.5/(n-1)$, where $\lambda$ is a wavelength of measured light passing through the optical low-pass filter and n is a refractive index of material forming the optical low-pass filter.

9. A photometer system that measures light for use in a camera downstream from a point where a first composed image is formed from light passing through a photographic lens, comprising:

an optical low-pass filter disposed downstream from the first point where the first composed image is formed, the optical low-pass filter eliminating a high frequency component of light from spatial frequencies of light from the photographic subject, the optical low-pass filter comprising a plurality of phase components on a surface, wherein the phase components have a height h defined by $h = \lambda * 0.5/(n-1)$, wherein $\lambda$ is a wavelength of measured light passing through the filter and n is a refractive index of material forming the filter;

a photometric optical system disposed downstream from the optical low-pass filter, the photometric optical system forming a second composed image at a second point; and a plurality of photometric sensors disposed substantially at the second point that measure light from the second composed image.

10. The photometer system of claim 9 wherein the phase components include convex and concave elements.

11. The photometer system of claim 9 wherein the phase components are distributed randomly on the surface to prevent generation of interference patterns of light and wherein the surface is flat.

12. The photometer system of claim 9 wherein the phase components have a circular shape.

13. The photometer system of claim 9 wherein the phase components have an elliptical shape.

14. The photometer system of claim 9 wherein the phase components cover approximately one-half of the surface of the filter.

15. A photometer system that measures light for use in a camera downstream from a point where a first composed image is formed from light passing through a photographic lens, comprising:

an optical low-pass filter disposed downstream from said first point where the first composed image is formed, the optical low-pass filter eliminating a high frequency component of light from spatial frequencies of light from the photographic subject, the optical low-pass filter comprising a plurality of phase components on a surface, a photometric system disposed downstream from the optical low-pass filter, the photometric optical system forming a second composed image at a second point; and a plurality of photometric sensors disposed substantially at the second point that measure light from the second composed image, wherein the phase components have a diameter D defined by $D \leq \lambda * f/p$, wherein $\lambda$ is a wavelength of measured light passing through the filter, f is a focal distance of the photometric optical system, and p is a space between the plural photometric sensors.

* * * * *